(12) United States Patent  
Golan et al.

(10) Patent No.: US 10,634,612 B2
(45) Date of Patent: Apr. 28, 2020

(54) ASSESSMENT OF PRIMER CONTENT ON A PRINT SUBSTRATE

(71) Applicant: HP INDIGO B.V., Amstelveen (NL)

(72) Inventors: Eviatar Golan, Ness Ziona (IL); Maxim Shlimovich, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/098,099

(22) PCT Filed: Jul. 19, 2016

(86) PCT No.: PCT/EP2016/067134
§ 371 (c)(1),
(2) Date: Oct. 31, 2018

(87) PCT Pub. No.: WO2018/014938
PCT Pub. Date: Jan. 25, 2018

(65) Prior Publication Data
US 2019/0145893 A1  May 16, 2019

(51) Int. Cl.
G01N 21/552 (2014.01)
G01N 21/84 (2006.01)
G01N 21/35 (2014.01)

(52) U.S. Cl.
CPC ....... G01N 21/552 (2013.01); G01N 21/8422 (2013.01); G01N 2021/3595 (2013.01); G01N 2021/8427 (2013.01)

(58) Field of Classification Search
None
See application file for complete search history.

(56) References Cited

U.S. PATENT DOCUMENTS

| 5,310,604 | A | 5/1994 | Melancon et al. |
| 6,179,918 | B1 | 1/2001 | Belotserkovsky |
| 7,767,970 | B2 | 8/2010 | Shelley et al. |
| 2015/0377608 | A1 | 12/2015 | Kumar et al. |
| 2016/0068640 | A1 | 3/2016 | Brennan et al. |
| 2017/0210867 | A1* | 7/2017 | Cooper ............ C09D 7/65 |

FOREIGN PATENT DOCUMENTS

| JP | 2014135354 | 7/2011 |
| WO | WO-01/58695 | 8/1996 |

OTHER PUBLICATIONS

Chen H-J., et al. Quantitative Analysis of Surface Composition of Polypropylene Blends Using Attenuated Total Reflectance FTIR Spectroscopy, Aug. 2008, < http://www.ncbi.nlm.nih.gov/pubmed/18975806 >.

* cited by examiner

Primary Examiner — Tam M Nguyen
(74) Attorney, Agent, or Firm — Middleton Reutlinger

(57) ABSTRACT

Herein is described a method for assessing primer composition coat weight on a print substrate. The method comprises providing a primed print substrate and spectroscopically analysing the primed print substrate using Fourier transform infrared (FTIR) spectroscopy by attenuated total reflectance (ATR) to produce a FTIR spectrum. A primer peak in the FTIR spectrum characteristic of the primer composition, and a print substrate peak characteristic of the print substrate are then identified and compared to assess the primer coat weight on the print substrate of the primed print substrate.

10 Claims, 7 Drawing Sheets

ASSESSMENT OF PRIMER CONTENT ON A PRINT SUBSTRATE

BACKGROUND

Print substrates are materials, such as paper substrates or polymeric substrates etc., on which images may be printed using various printing techniques such as gravure printing, lithographic printing, inkjet printing and electrostatic printing (including liquid electrostatic printing). Prior to printing an image on a print substrate, it may be desirable to provide a primer layer on the print substrate, for example to prepare the print substrate to receive an image. It may be desirable to determine the coat weight of primer on the print substrate, for example to ensure that the print substrate is suitably prepared to receive an image, while also minimising the amount of primer used. A primer may be deposited onto a print substrate in order to improve adhesion of an image to the print substrate. It may also be desirable to control the coat weight of primer on the print substrate. Some previous methods of determining the coat weight of a primer on a print substrate employ gravimetric analysis. The results obtained by gravimetric analysis may vary due to operator technique.

BRIEF DESCRIPTION OF THE FIGURES

Non-limiting examples will now be described, with reference to the accompanying drawings, in which.

DETAILED DESCRIPTION

Figure 1A:
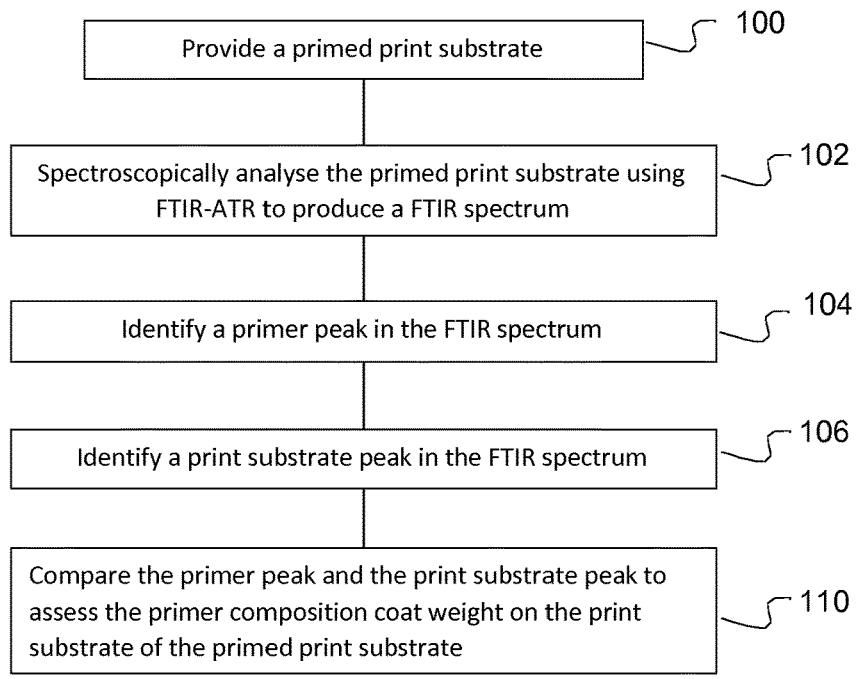
FIG. 1a is a flow diagram of an example of a method for assessing primer composition coat weight on a print substrate.

Before the methods and related aspects of the disclosure are disclosed and described, it is to be understood that this disclosure is not restricted to the particular process and apparatus features disclosed herein because such process and apparatus features may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the word "comprising" does not exclude the presence of elements other than those listed in a claim, "a" or "an" does not exclude a plurality, and a single processor or other unit may fulfil the functions of several units recited in the claims.

As used herein, the term "about" is used to provide flexibility to a numerical range endpoint by providing that a given value may be a little above or a little below the endpoint to allow for variation in test methods or apparatus.

Herein is described a method for assessing primer composition coat weight on a print substrate. The method comprises providing a primed print substrate and spectroscopically analysing the primed print substrate using Fourier transform infrared (FTIR) spectroscopy by attenuated total reflectance (ATR) to produce a FTIR spectrum. A primer peak in the FTIR spectrum characteristic of the primer composition, and a print substrate peak characteristic of the print substrate are then identified and compared to assess the primer coat weight on the print substrate of the primed print substrate.

Herein is described a method for assessing primer composition coat weight on a print substrate. The method comprises providing a primed print substrate and spectroscopically analysing the primed print substrate using Fourier transform infrared (FTIR) spectroscopy by attenuated total reflectance (ATR) to produce a FTIR spectrum. A primer peak in the FTIR spectrum characteristic of the primer composition, and a print substrate peak characteristic of the print substrate are then identified and a parameter of each of the peaks, for example the peak areas or peak heights, calculated. The ratio of the primer peak parameter, e.g. primer peak area, to the print substrate peak parameter, e.g. print substrate peak area, is then calculated and compared to a calibration standard in order to determine the primer coat weight on the print substrate of the primed print substrate.

Herein is described a method for assessing primer composition coat weight on a print substrate, the method comprising:

providing a primed print substrate comprising an organic print substrate material on which a primer layer comprising an organic primer composition is disposed;

spectroscopically analysing the primed print substrate using Fourier transform infrared (FTIR) spectroscopy by attenuated total reflectance (ATR) to produce a FTIR spectrum of the primer layer disposed on the print substrate;

identifying a primer peak in the FTIR spectrum which is characteristic of the organic primer composition;

identifying a print substrate peak in the FTIR spectrum which is characteristic of the organic print substrate material; and comparing the primer peak and the print substrate peak to assess the primer composition coat weight on the print substrate of the primed print substrate.

Herein is described a method for assessing primer composition coat weight on a print substrate, the method comprising:

providing a primed print substrate comprising an organic print substrate material on which a primer layer comprising an organic primer composition is disposed; spectroscopically analysing the primed print substrate using Fourier transform infrared (FTIR) spectroscopy by attenuated total reflectance (ATR) to produce a FTIR spectrum of the primer layer disposed on the print substrate;

identifying a primer peak in the FTIR spectrum which is characteristic of the organic primer composition and calculating the area of the primer peak;

identifying a print substrate peak in the FTIR spectrum which is characteristic of the organic print substrate material and calculating the area of the print substrate peak;

calculating the peak area ratio of the primer peak area to the print substrate peak area; and comparing the calculated peak area ratio with a calibration standard to determine the primer composition coat weight on the print substrate of the primed print substrate, the calibration standard being prepared by calculating a peak area ratio from FTIR spectra obtained for each of a plurality of primed print substrate samples each comprising a primer layer having a known coat weight of the primer composition disposed on the print substrate material.

Described herein is a printing system comprising:

a printer unit to print an image on a primed print substrate to form an image disposed on a primer layer of the primed print substrate; and a FTIR-ATR module to provide a FTIR spectrum of the primer layer disposed on the print substrate prior to printing an image on the primed print substrate.

Described herein is a non-transitory computer readable storage medium encoded with instructions, executable by a processor, comprising:

instructions to identify a primer peak in a FTIR spectrum of a primed print substrate, wherein the primed print substrate comprises an organic print substrate material on which a primer layer comprising an organic primer composition is disposed, and the primer peak is a peak in the FTIR spectrum which is characteristic of the organic primer composition;

instructions to identify a print substrate peak in the FTIR spectrum of the primed print substrate, wherein the print substrate peak is a peak in the FTIR spectrum which is characteristic of the organic print substrate material; and instructions to compare the primer peak and the print substrate peak to assess the primer composition coat weight on the print substrate of the primed print substrate.

Described herein is a non-transitory computer readable storage medium encoded with instructions, executable by a processor, comprising:

instructions to identify a primer peak in a FTIR spectrum of a primed print substrate, wherein the primed print substrate comprises an organic print substrate material on which a primer layer comprising an organic primer composition is disposed, and the primer peak is a peak in the FTIR spectrum which is characteristic of the organic primer composition;

instructions to identify a print substrate peak in the FTIR spectrum of the primed print substrate, wherein the print substrate peak is a peak in the FTIR spectrum which is characteristic of the organic print substrate material;

instructions to determine the area of the primer peak and the area of the print substrate;

instructions to calculate the peak area ratio of the primer peak area to the print substrate peak area; and instructions to determine the primer composition coat weight of the primed print substrate from the calculated peak area ratio.

Some examples herein refer to print substrates and/or primed print substrates. A print substrate may be any suitable substrate capable of having an image printed thereon. The print substrate may comprise, e.g. be formed of, an organic material, i.e. the print substrate material may be an organic material. The print substrate material may be a polymeric material (e.g. a polymer film), such as a synthetic polymeric material. Synthetic polymeric materials, include, for example: polyesters, including, for example, polyethylene terephthalate (PET); a polymer formed from alkylene monomers, including, for example, polyethylene and polypropylene (including biaxial orientated polypropylene (BOPP)); polyamides; polyvinyl chloride (PVBC); and co-polymers such as styrene-butadiene copolymers. The print substrate material may be a polymeric material (e.g. a polymer film), such as a natural polymeric material, for example cellulose. In some examples, the print substrate material includes a cellulosic paper, in some examples a cellulosic paper coated with a polymeric material, e.g. a polymer formed from styrene-butadiene resin. In some examples, the print substrate comprises cardboard. In some examples, the print substrate material is PET.

Some examples herein refer to a primer layer comprising a primer composition, for example a primer layer disposed on a print substrate to form a primed print substrate. The primer composition may be an organic primer composition comprising an organic primer resin. For example an organic primer resin dispersed in a carrier solvent. In some examples, the carrier solvent is a polar carrier liquid. In some examples, the primer composition is an aqueous primer composition (i.e. the carrier solvent/polar carrier liquid is water). In some examples, the polar carrier may be a polar solvent, for example alcohol such as isopropanol. In some examples, the organic primer resin may be a polymer which is dispersible or dissolvable in the carrier solvent, e.g. the polar carrier liquid. In some examples, the organic primer resin may be selected from the group comprising or consisting of hydroxyl containing resins (e.g., polyvinyl alcohol resins and cellulose derivatives) carboxylic group containing resins (e.g., olefin co-acrylic or methacrylic acid based copolymers, polyacrylic acid based polymers and polylactic acid based polymers) amine based polymer formulations (e.g., polyamines, polyamides and polyethylene imines), polyurethanes, polyesters and combinations thereof. In some examples, the organic primer resin may be selected from the group comprising, or consisting of, a polyvinyl alcohol resin, cellulose based resins, a polyester, a polyamine, a polyethylene imine resin, polyamide resin, polyurethane, copolymers of an alkylene monomer and an acrylic or methacrylic acid monomer, polyacrylic polymers and combinations thereof. In some examples, the organic primer composition comprises ethylene acrylic acid (EEA), polyethylene imine (PEI), polyurethanes, polyamides, or poly vinyl acetates. In some examples, the organic primer composition comprises, polyethylene imine (PEI), polyamides, or poly vinyl acetates. In some examples, the organic primer composition comprises polyethyleneimine (PEI). Examples of materials suitable as the organic primer composition are DigiPrime® 050 and DigiPrime® 060 (available from Michelman®).

Examples of materials suitable as the organic primer composition are DigiPrime® 050, DigiPrime® 060, DigiPrime® 1500LA, DigiPrime® 2000, DigiPrime® 2500, DigiPrime® 3000, DigiPrime® 4431, DigiPrime® 4450, DigiPrime® 5000, DigiPrime® 5100, DigiPrime® 680, Michem® In-Line Primer 030, Michem® In-Line Primer 040, Michem® In-Line Primer Q4304A, Michem® In-Line Primer Q4305A, Michem® In-Line Primer Q4324A, Michem® In-Line Primer Q4325A, Sapphire 5.0 and Topaz 17 Solution (all available from Michelman®).

A primed print substrate as described herein may be provided by coating a print substrate as described above with a primer composition. The print substrate may be coated with a primer composition using any suitable coating method, for example rod coating, gravure coating, flexo coating or tinting coating (i.e. differential direct roll coating, for example using the 22D-875 roll coater from Black Bros. Co.). The print substrate may be coated with a primer composition to produce a primed print substrate comprising a primer layer disposed on the print substrate. The primer layer may have a thickness of less than about 2 µm, for example less than about 1 µm, or less than about 0.5 µm. The primer composition on the print substrate may have a wet coat weight (i.e. total weight of primer composition, e.g. measured before drying of the primer composition) of greater than about 0.1 g/m$^2$, for example at least about 0.5 g/m$^2$, or about 1 g/m$^2$. In some examples, the primer composition on the print substrate may have a wet coat weight of up to about 5 g/m$^2$, for example up to about 2 g/m$^2$. In some examples, the primer composition on the print substrate may have a wet coat weight of 0.1-5 g/m$^2$, for example 0.5-2 g/m$^2$. The primer composition on the print substrate may have a dry coat weight (e.g. weight of primer resin, e.g. not including primer solvent, or the coat weight of the primer composition after drying the primer composition on the print substrate) of greater than about 0.1 g/m$^2$, for example at least about 0.5 g/m$^2$, or about 0.1 g/m$^2$. In some examples, the primer composition on the print substrate may have a wet coat weight of up to about 0.5 g/m$^2$, for example up to about 0.2 g/m$^2$. In some examples, the primer composition on the print substrate may have a wet coat weight of 0.01-0.5 g/m$^2$, for example 0.05-0.2 g/m$^2$.

FIG. 1a is an example of a method for assessing primer composition coat weight on a print substrate. The method may comprise, in block 100, providing a primed print substrate.

In some examples, the primed print substrate comprises an organic print substrate material on which a primer layer comprising an organic primer composition is disposed. In some examples, the organic primer composition comprises a group (e.g. an organic group) having an absorption peak (i.e. an IR absorption peak) in the range of about 2000-1350 cm$^{-1}$ or about 3600-2400 cm$^{-1}$. In some examples, the organic primer composition comprises a group having an absorption peak in the range of about 3600-2400 cm$^{-1}$, for example about 2400-3000 cm$^{-1}$, about 2400-2900 cm$^{-1}$, about 2880-2490 cm$^{-1}$, or about 2850 cm$^{-1}$. In some examples, the organic primer composition comprises a group having an absorption peak in the range of about 3600-3000 cm$^{-1}$. In some examples, the organic primer composition comprises a group having an absorption peak in the range of about 2000-1350 cm$^{-1}$. In some examples, the organic primer composition comprises a group having an absorption peak in the range of about 1800-1350 cm$^{-1}$, for example about 1800-1600 cm$^{-1}$, or at about 1700 cm$^{-1}$, or at about 1720 cm$^{-1}$. In some examples the organic primer composition comprises a group having an absorption peak in the range of about 1500-1350 cm$^{-1}$, for example about 1450-1335 cm$^{-1}$, or about 1430-1385 cm$^{-1}$. In some examples, the organic primer composition comprises a first group having an absorption peak in the range of about 2400-2900 cm$^{-1}$ and a second group having an absorption peak in the range of about 3600-3000 cm$^{-1}$. In some examples, the organic print substrate material comprises a group (e.g. an organic group) having an absorption peak (i.e. an IR absorption peak) in the range of about 2000-1400 cm$^{-1}$ or about 3600-2400 cm$^{-1}$. In some examples, the organic primer composition comprises a group having an absorption peak in the range of about 3600-2400 cm$^{-1}$, for example about 2400-3000 cm$^{-1}$, about 2400-2900 cm$^{-1}$, about 2880-2490 cm$^{-1}$, or about 2850 cm$^{-1}$. In some examples, the organic primer composition comprises a group having an absorption peak in the range of about 3600-3000 cm$^{-1}$. In some examples, the organic print substrate material comprises a group having an absorption peak in the range of about 2000-1350 cm$^{-1}$. In some examples, the organic print substrate material comprises a group having an absorption peak in the range of about 1800-1350 cm$^{-1}$, for example about 1800-1600 cm$^{-1}$, or at about 1700 cm$^{-1}$, or at about 1720 cm$^{-1}$. In some examples the organic print substrate material comprises a group having an absorption peak in the range of about 1500-1350 cm$^{-1}$, for example about 1450-1335 cm$^{-1}$, or about 1430-1385 cm$^{-1}$. In some examples, the organic primer composition comprises a group having an absorption primer peak in a different range (for example of those ranges described above) to an absorption print substrate peak of a group of the organic print substrate. In some examples, the organic primer composition comprises a group having an absorption primer peak in the range of either 2000-1350 cm$^{-1}$ or 3000-2400 cm$^{-1}$, and the print substrate material comprises a group having an absorption print substrate peak in the other of the range of 2000-1350 cm$^{-1}$ or 3000-2400 cm$^{-1}$. For example, a print substrate may comprise a C=O group, for example a C=O group have an absorption peak in the range of about 1690-1760 cm$^{-1}$, e.g. about 1720 cm$^{-1}$ (such as a PET print substrate). For example, a print substrate may comprise a CH group, for example a CH group having an absorption peak in the range of about 1430-1385 cm$^{-1}$ (such as a PET print substrate). For example, a primer composition may comprise a methylene (CH$_2$) group having an absorption primer peak in the range of about 2900-2500 cm$^{-1}$, e.g. about 2850 cm$^{-1}$ (such as a PEI primer composition) and/or a OH group having an absorption peak in the range of about 3600-3000 cm$^{-1}$, or about 3300 cm$^{-1}$ (such as an aqueous PEI primer composition). The print substrate may comprise substantially no groups having absorption peaks in the range of a primer peak in the FTIR spectrum. The primer composition may comprise substantially no groups having absorption peaks in the range of a print substrate peak in the FTIR spectrum. However, this method may be used even if the print substrate comprises groups having absorption peaks in the range of the primer peak in the FTIR spectrum and/or vice versa.

Block 102 comprises spectroscopically analysing the primed print substrate using Fourier transform infrared (FTIR) spectroscopy by attenuated total reflectance (ATR) to produce a FTIR spectrum, for example an FTIR spectrum of the primer layer disposed on the print substrate. The primed print substrate may be spectroscopically analysed by placing the primed print substrate comprising a primer layer disposed on a print substrate material such that the primer layer faces, in some examples contacts, an ATR crystal of an FTIR-ATR apparatus. The ATR crystal may be a germanium crystal, ZnSe crystal, diamond crystal, ZnS crystal, silicon crystal, or AMTIR crystal. In some examples, the ATR crystal is a germanium crystal. The ATR crystal may have a path length in the range of about 0.1-20 µm, for example about 10

μm. Single bounce or multi-bounce ATR may be used. For example, the ATR crystal may provide for 1 reflection (single-bounce ATR) or about 10 reflections (multi-bounce ATR). The ATR crystal may have a crystal angle of about 45°-65°, for example about 45°. The grazing angle may be from 5° to 89°, for example from 8° to 85°, from about 20-70°, from about 30-60°, from about 40-50°, or about 45°. Spectroscopic analysis may be carried out using a commercially available FTIR spectrometer and ATR crystal, for example a Thermo Fisher FTIR with Smart Multi Bounce HATR and Ge crystal, e.g. Thermo Nicolet 6700 equipped with Smart Multi Bounce HATR and Ge crystal.

Figure 7:
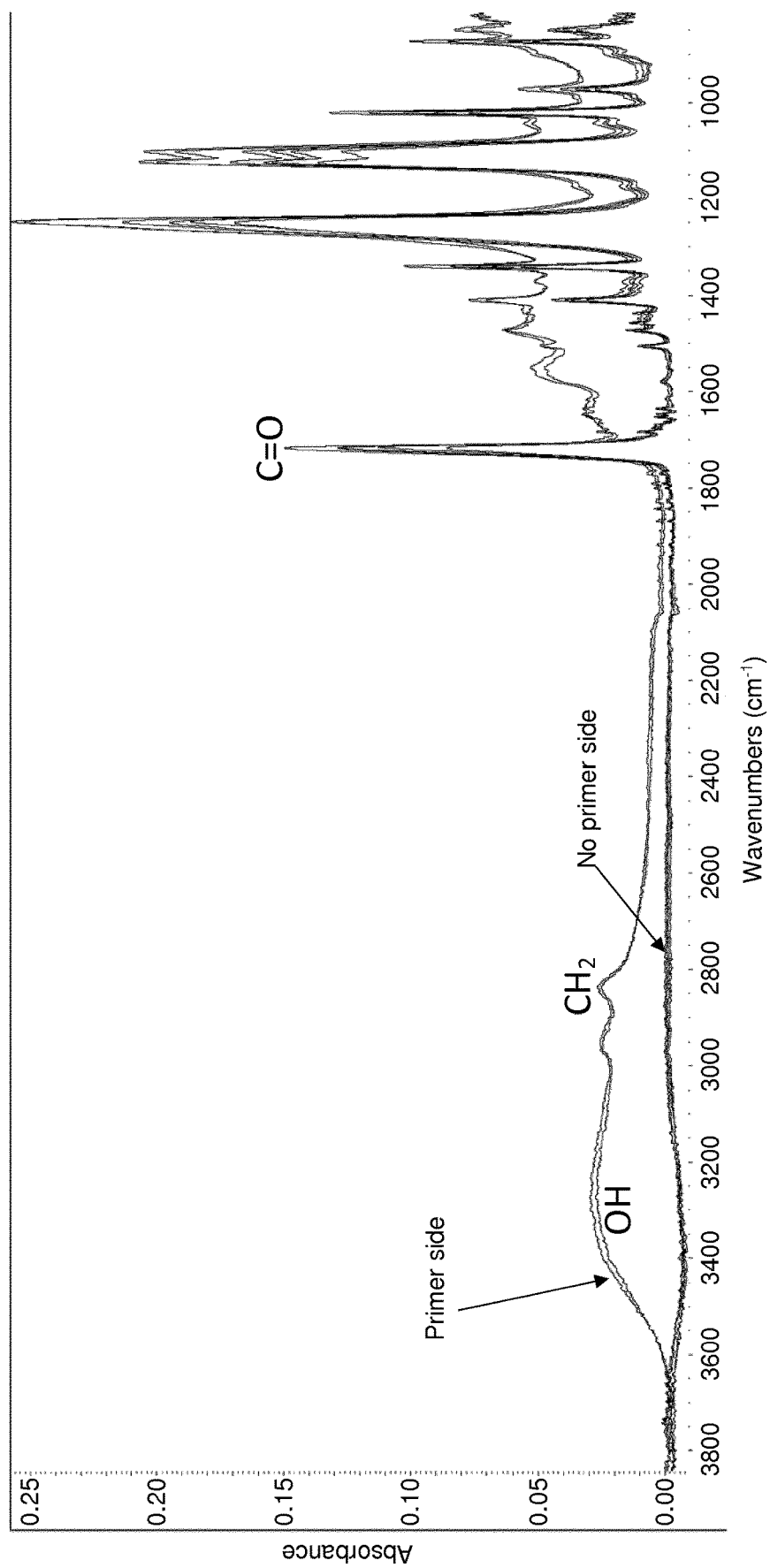
FIG. 7 shows an example of a FTIR spectrum of a primed print substrate overlying a FTIR spectrum of the PET print substrate with no primer layer.

Block 104 comprises identifying a primer peak in the FTIR spectrum which is characteristic of the organic primer composition. Identifying a primer peak in the FTIR spectrum may comprise providing a FTIR spectrum of the print substrate with no primer layer and comparing a FTIR spectrum of the clean print substrate (i.e. the print substrate with no primer layer) to a FTIR spectrum of the primer layer on the print substrate, for example as shown in FIG. 7. The primer peak in the FTIR spectrum may be selected as one of the peaks of the FTIR spectrum of the primer layer on the print substrate which doesn't appear on the FTIR spectrum of the clean print substrate or a peak that appears on both FTIR spectrums, but appears as a larger peak (e.g. by peak height or area) on the FTIR spectrum or the primer layer on the print substrate.

Block 106 comprises identifying a print substrate peak in the FTIR spectrum which is characteristic of the organic print substrate material. Identifying a print substrate peak in the FTIR spectrum may comprise providing a FTIR spectrum of the print substrate with no primer layer and comparing a FTIR spectrum of the clean print substrate (i.e. the print substrate with no primer layer) to a FTIR spectrum of the primer layer on the print substrate, for example as shown in FIG. 7. The print substrate peak in the FTIR spectrum may be selected as one of the peaks which occurs in both the FTIR spectrum of the primer layer on the print substrate and the FTIR spectrum of the clean print substrate, in some examples a peak which has the same appearance in both the FTIR spectrum of the clean print substrate and the FTIR spectrum of the primer layer on the print substrate.

Block 110 comprises comparing the primer peak and the print substrate peak to assess, e.g. to determine, the primer composition coat weight on the print substrate of the primed print substrate. Comparing the primer peak and the print substrate peak may comprise comparing a parameter of the primer peak and the print substrate peak, for example the parameter may be peak area or peak height. In some examples, the method comprises calculating a parameter of the primer peak and calculating the same parameter of the print substrate peak. In some examples, the method comprises calculating a ratio of the primer peak parameter to the print substrate peak parameter (e.g. the peak height ratio or peak area ratio). In some examples, the method comprises comparing the calculated peak parameter ratio (e.g. the peak area ratio of the peak height ratio) to a calibration standard to determine the primer composition coat weight on the print substrate of the primed print substrate. In some examples, the calibration standard may be prepared by calculating the peak parameter ratio from FTIR spectra obtained for each of a plurality of primed print substrate samples each comprising a primer layer having a known coat weight of the primer composition disposed on the print substrate material.

Figure 1B:
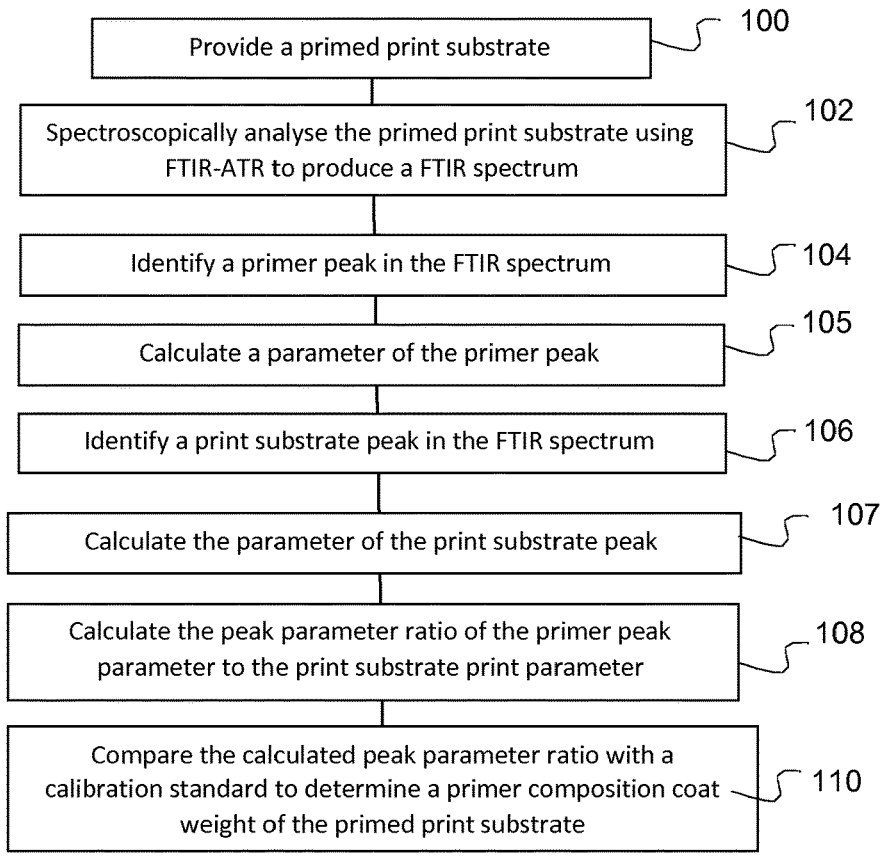
FIG. 1b is a flow diagram of another example of a method for assessing primer composition coat weight on a print substrate.

FIG. 1b is another example of a method for assessing primer composition coat weight on a print substrate. The method may comprise, in block 100, providing a primed print substrate, for example as described above. Block 102 comprises spectroscopically analysing the primed print substrate using Fourier transform infrared (FTIR) spectroscopy by attenuated total reflectance (ATR) to produce a FTIR spectrum, for example at FTIR spectrum of the primer layer disposed on the print substrate, for example as described above. Block 104 comprises identifying a primer peak in the FTIR spectrum which is characteristic of the organic primer composition, for example as described above. Block 106 comprises identifying a print substrate peak in the FTIR spectrum which is characteristic of the organic print substrate material, for example as described above. Block 105 comprises calculating a parameter of the primer peak. Block 107 comprises calculating a parameter of the print substrate peak, where the parameter of the print substrate peak and the parameter of the primer peak are the same parameter, e.g. the area. In some examples, calculating the a parameter of the peaks, for example calculating the peak areas, or peak heights, may comprise providing a background FTIR spectrum, e.g. a FTIR spectrum of air, and in some examples subtracting the background FTIR spectrum from the FTIR spectrum of the primer layer disposed on the print substrate before calculating the parameter of the peaks.

Block 108 comprises calculating the peak parameter ratio of the primer peak parameter to the print substrate peak parameter.

Block 110 comprises comparing the calculated peak parameter ratio with a calibration standard to determine the primer composition coat weight on the print substrate of the primed print substrate. The calibration standard may be prepared, as described in the examples below, by calculating a peak parameter ratio from FTIR spectra obtained for each of a plurality of primed print substrate samples each comprising a primer layer having a known coat weight of the primer composition disposed on the print substrate material.

Figure 1C:
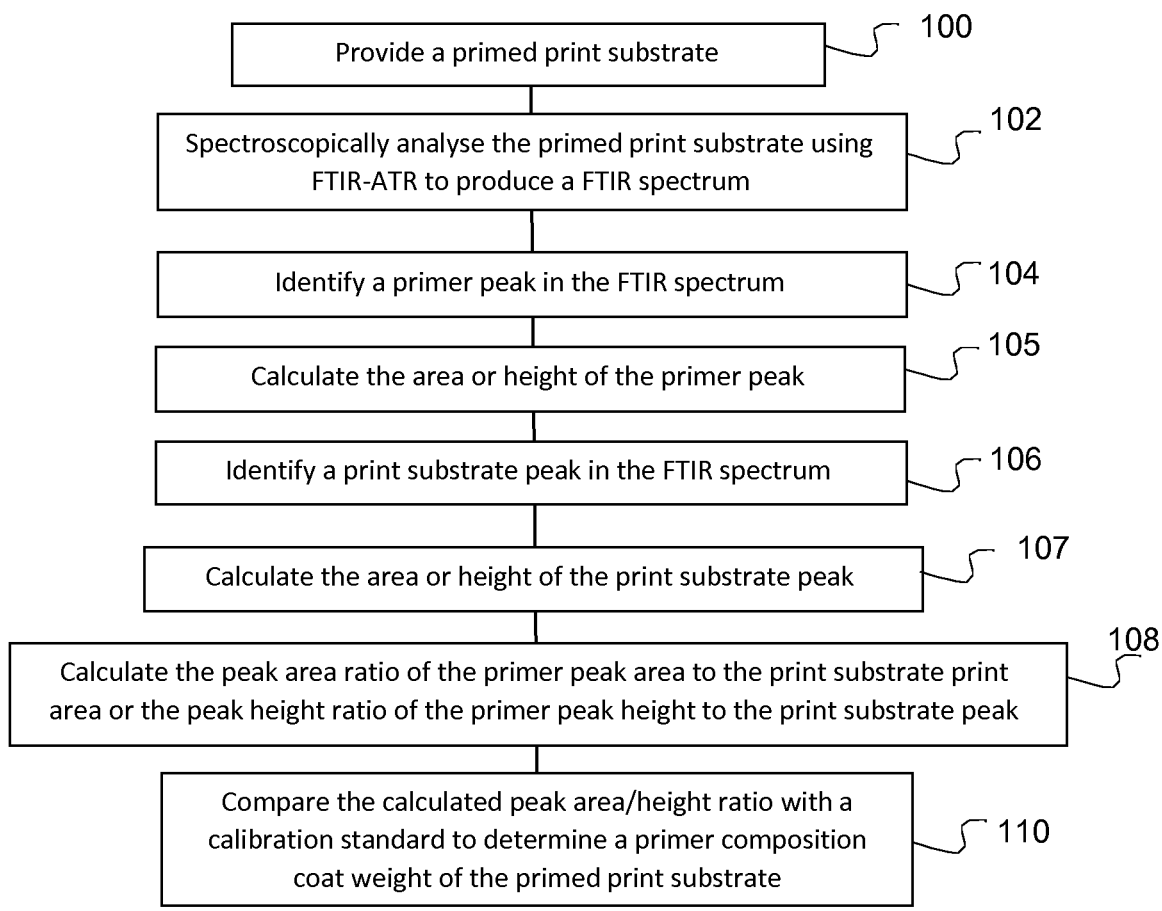
FIG. 1c is a flow diagram of another example of a method for assessing primer composition coat weight on a print substrate.

FIG. 1c is another example of a method for assessing primer composition coat weight on a print substrate. The method may comprise, in block 100, providing a primed print substrate, for example as described above. Block 102 comprises spectroscopically analysing the primed print substrate using Fourier transform infrared (FTIR) spectroscopy by attenuated total reflectance (ATR) to produce a FTIR spectrum, for example at FTIR spectrum of the primer layer disposed on the print substrate, for example as described above. Block 104 comprises identifying a primer peak in the FTIR spectrum which is characteristic of the organic primer composition, for example as described above. Block 106 comprises identifying a print substrate peak in the FTIR spectrum which is characteristic of the organic print substrate material, for example as described above. Block 105 comprises calculating the area or height of the primer peak. Block 107 comprises calculating the area or height of the print substrate peak. Calculating each of the peak areas may comprise integrating each of the peaks, which may be carried out using IR software. In some examples, calculating the a parameter of the peaks, for example calculating the peak areas, or peak heights, may comprise providing a background FTIR spectrum, e.g. a FTIR spectrum of air, and in some examples subtracting the background FTIR spectrum from the FTIR spectrum of the primer layer disposed on the print substrate before calculating the parameter of the peaks.

Block 108 comprises calculating the peak area ratio of the primer peak area to the print substrate peak area or calculating the peak height ratio of the primer peak height the print substrate peak height.

In some examples, the method comprises providing a FTIR spectrum of a clean print substrate (e.g. a print substrate on which no primer composition is disposed). In some examples, the method comprises calculating a peak parameter ratio (e.g. peak area ratio or peak height ratio) for a peak of the FTIR spectrum of the clean print substrate corresponding to the primer peak (for example, if the primer peak identified is a methylene absorption peak, a peak of the print substrate corresponding to the primer peak will be a methylene absorption peak occurring at the same or similar wave number to the primer methylene absorption peak) and the identified print substrate peak and subtracting the calculated peak parameter ratio for the FTIR spectrum of the clean print substrate from the peak parameter ratio calculated for the FTIR spectrum of the primer layer composition disposed on the print substrate. This method may improve the assessment of primer composition coat weight, for example when the print substrate and the primer composition comprise a group providing the same absorption peak, even if this absorption peak is identified as the primer peak or the print substrate peak.

Block 110 comprises comparing the calculated peak area ratio or peak height ratio with a calibration standard to determine the primer composition coat weight on the print substrate of the primed print substrate. The calibration standard may be prepared, as described in the examples below, by calculating a peak area ratio from FTIR spectra obtained for each of a plurality of primed print substrate samples each comprising a primer layer having a known coat weight of the primer composition disposed on the print substrate material. The calibration standard may be prepared by calculating a peak height ratio from FTIR spectra obtained for each of a plurality of primed print substrate samples each comprising a primer layer having a known coat weight of the primer composition disposed on the print substrate material.

In some examples, assessing the primer composition coat weight may comprise determining whether the coat weight falls above, below or within a pre-determined range.

In some examples, the method further comprises determining the primer composition coverage on the primed print substrate. Determining primer composition coverage on the primed print substrate may comprise carrying out the method described above for each of a plurality of areas of the primed print substrate and comparing the primer composition coat weight for each of the plurality of areas. In some examples, each of the plurality of areas may have an area of at least about 1 cm$^2$, for example about 5 cm$^2$. In some examples, each of the plurality of areas of the primed print substrate may be spaced apart, for example by at least about 1 cm, for example by at least about 5 cm, by at least about 10 cm, or at least about 20 cm. In some examples, each of the plurality of areas of the primed print substrate may be spaced apart in two dimensions, for example by at least about 1 cm, for example by at least about 5 cm, by at least about 10 cm, or at least about 20 cm. In some examples, the method may comprise determining whether the primer coat weight determined for each of the plurality of areas falls within a pre-determined range. In some examples, the method may comprise determining whether the primer coat weight determined for each of the plurality of areas are all within a pre-determined range.

Figure 2:
FIG. 2 is a schematic illustration of an example of a printing system.

FIG. 2 is an example of a printing system 200. The printing system 200 may comprise a printer unit 202 and a FTIR-ATR module 204. In some examples, the printer unit 202 is for printing an image on a primed print substrate to form an image disposed on a primer layer of the primed print substrate. In some examples, the FTIR-ATR module 204 is to provide a FTIR spectrum of the primer layer disposed on the print substrate prior to printing an image on the primed print substrate.

The printer unit 202 may be selected from a gravure printing apparatus, a lithographic printing apparatus, an inkjet printing apparatus and an electrostatic printing apparatus such as a liquid electrophotographic printing apparatus. "Electrostatic printing" or "electrophotographic printing" generally refers to the process that provides an image that is transferred from a photo imaging substrate or plate either directly or indirectly via an intermediate transfer member to a print substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

The FTIR-ATR module 204 may comprise an FTIR-ATR apparatus for spectroscopically analysing the primed print substrate. The FTIR-ATR module 204 may be positioned in line with the printing unit 202, such that a print substrate enters the FTIR-ATR module 204 before entering the printing unit 202. The FTIR-ATR apparatus used may be a commercially available FTIR spectrometer and ATR crystal, for example a Thermo Fisher FTIR with Smart Multi Bounce HATR and Ge crystal, e.g. Thermo Nicolet 6700 equipped with Smart Multi Bounce HATR and Ge crystal. The FTIR-ATR module 204 may further comprise a processor loadable with instructions to determine the primer coat weight of the primed print substrate from the FTIR spectrum of the primed print substrate. In some examples, the FTIR-module 204 provides an output, for example to signal whether the primer coat weight is above, below or within a pre-defined range. In some examples, the FTIR-module 204 provides an output provide an operator with an indication as to the primer composition coat weight of the primed print substrate, for example to provide details of the primer composition coat weight, to provide an indication of whether the primer composition coat weight is above, within, or below a pre-defined primer composition coat weight, for example a pre-defined primer composition coat weight range.

Figure 3:
FIG. 3 is a schematic illustration of another example of a printing system.

FIG. 3 shows a schematic illustration of another example of a printing system 300 comprising a printing unit 302, a FTIR module 304 and a primer unit 306. In some examples, the primer unit 306 is to for applying a primer composition to a print substrate to produce a primed print substrate. The primer unit 306 may be positioned in line with the FTIR-ATR module 304 and the printing unit 302, such that a print substrate enters the primer unit 306 for a primer composition to be applied to the print substrate to provide a primed print substrate, the primed print substrate may then enter the FTIR-ATR module 304 such that the primer coat weight may be determined before the primed print substrate enters the printing unit 302 for an image to be transferred to the primer layer disposed on the print substrate. In some examples, the printing system 300 comprises a controller unit linking the FTIR-ATR module 304 to the primer unit 306 and/or the printing unit 302. In some examples, the controller unit links the FTIR-ATR module 304 to the printing unit 302. In some examples, the controller unit communicates an output from the FTIR-ATR module 304 with the printing unit 302. In some examples, the controller unit communicates an output from the FTIR-ATR module 304 with the primer unit 306. For example, the FTIR-ATR module 304 may provide an output to indicate that the primer coat weight is above or below a pre-determined primer coat weight, for example above or below a pre-determined primer coat weight range. For example, the FTIR-ATR module 304 may provide an output to indicate that the primer coat weight is within pre-determined primer coat weight range. The controller unit may then communicate the output from the FTIR-ATR module 304 with the primer unit 306 or the printing unit 302. In some examples, the controller may prevent the printing unit 302 from printing on the print substrate if the FTIR-ATR module 304 indicates that the primer coat weight is above or below a pre-determined primer coat weight or primer coat weight range. In some examples, the controller unit may communicate with the primer unit 306, for example to increase or decrease the amount of primer composition applied to the print substrate by the primer unit 306 if the FTIR-ATR module 304 determines the primer coat weight to be below or above a pre-determined value (e.g. range) respectively.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of apparatus and modules described may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 4:
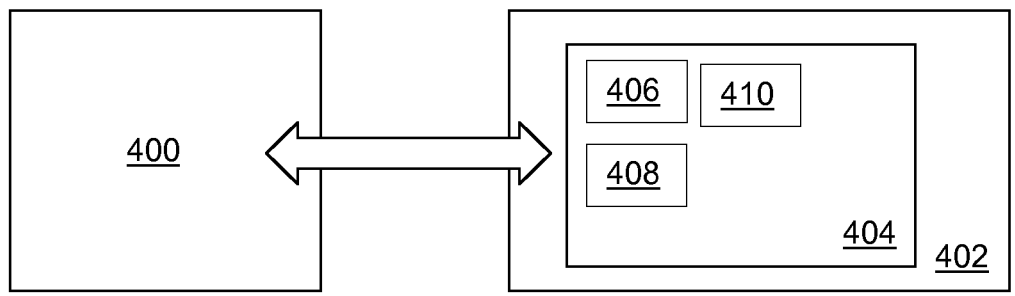
FIG. 4 is a simplified schematic of an example of a processor and a memory.

FIG. 4 shows an example of a processor 400 associated with a memory 402. The memory 402 comprises computer readable instructions 404 which are executable by the processor 400. The instructions 404 comprise:

Instructions 406 to identify a primer peak in a FTIR spectrum of a primed print substrate, wherein the primed print substrate comprises an organic print substrate material on which a primer layer comprising an organic primer composition is disposed, and the primer peak is a peak in the FTIR spectrum which is characteristic of the organic primer composition;

Instructions 408 to identify a print substrate peak in the FTIR spectrum of the primed print substrate, wherein the print substrate peak is a peak in the FTIR spectrum which is characteristic of the organic print substrate material;

Instructions 410 to compare the primer peak and the print substrate peak to assess the primer composition coat weight on the print substrate of the primed print substrate.

In some examples, instructions 404 may further comprise instructions to calculate a parameter, e.g. the area or height, of the primer peak and instructions to calculate the same parameter, e.g. the area or height of the print substrate peak. Instructions 410 to compare the primer peak and the prins subtrate peak may comprise instructions to calculate the peak parameter ratio of the primer peak parameter to the print substrate peak parameter. Instructions 410 to compare the primer peak and the print subtrate peak may further comprise instructions to compare the calculated peak parameter ratio with a calibration standard to determine the primer composition coat weight on the print substrate of the primed print substrate.

In some examples, instructions 404 may further comprise instructions to calculate the area or height of the primer peak and instructions to calculate the area or height of the print substrate peak. Instructions 410 to compare the primer peak and the print subtrate peak may comprise instructions to calculate the peak area ratio of the primer peak area to the print substrate peak area or instructions to calculate the peak height ratio of the primer peak height to the print substrate peak height. Instructions 410 to compare the primer peak and the print subtrate peak may further comprise instructions to compare the calculated peak area ratio or peak height ratio with a calibration standard to determine the primer composition coat weight on the print substrate of the primed print substrate.

Figure 5:
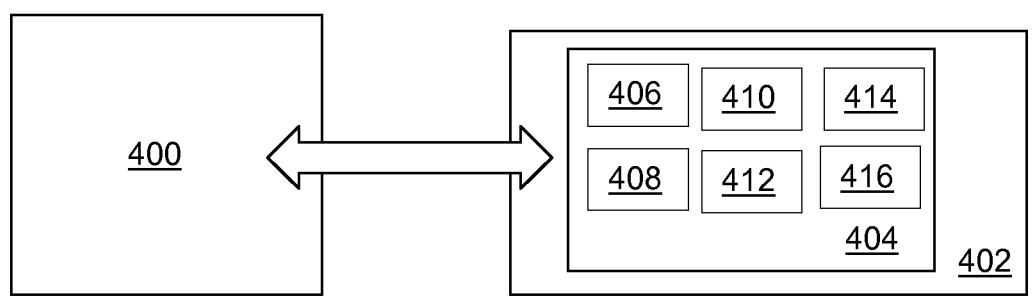
FIG. 5 is a simplified schematic of another example of a processor and a memory.

FIG. 5 shows another example of a processor 400 with associated memory 402. The memory 402 comprises computer readable instructions 404 which are executable by the processor 400. The instructions 404 further comprise Instructions 412 to calculate the area of the primer peak and the print substrate peak;

Instructions 414 to calculate the peak area ratio of the primer peak area to the print substrate peak area; and Instructions 416 to determine the primer composition coat weight of the primed print substrate from the calculated peak area ratio.

Figure 6:
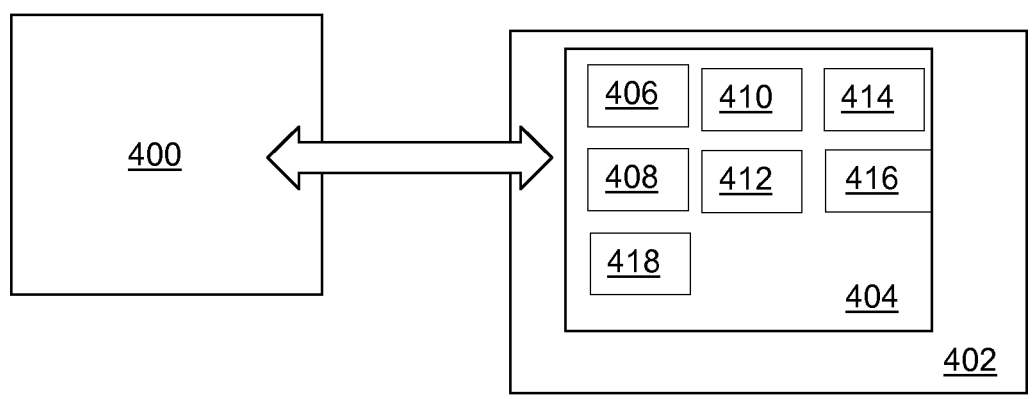
FIG. 6 is a simplified schematic of another example of a processor and a memory.

FIG. 6 shows another example of a processor 400 with associated memory 402. The memory 402 comprises computer readable instructions 404 which are executable by the processor 400. The instructions 404 further comprise:

Instructions 418 to determine primer composition coverage on the primed print substrate.

In some examples, the memory comprises computer readable instructions to determine whether the primer composition coat weight is below, within, or above a pre-determined range. In some examples, the memory comprises computer readable instructions to communicate with a primer unit to change (for example increase or decrease) the amount of primer applied to subsequent print substrates based on the determination of primer composition coat weight. In some examples, the memory comprises computer readable instructions to communicate with a primer unit to clean the primer unit based on the determination of primer composition coat weight or based on the determination of primer composition coverage on the print substrate. In some examples, the memory comprises computer readable instructions to communicate with a primer unit to adjust priming application units (e.g. rollers for applying primer to a print substrate) based on the determination of primer composition coat weight or based on the determination of primer composition coverage on the print substrate.

Such machine readable instructions may also be loaded onto a processor, such as a computer or other programmable data processing devices, so that the computer or other programmable data processing devices perform a series of operations to produce computer-implemented processing, thus the instructions executed on the computer or other programmable devices provide a operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

Unless otherwise stated, any feature described herein can be combined with any aspect or any other feature described herein.

The following illustrates examples of the methods and other aspects described herein. Thus, these examples should not be considered as limitations of the present disclosure, but are merely in place to teach how to make examples of the present disclosure.

Described herein is an example of a method for assessing primer composition coat weight on a print substrate. In this example, the organic print substrate material used was PET (PETLAR-PR by SRF) and the organic primer composition was a polyethyleneimine (PEI) aqueous primer (DigiPrime® 050, available from Michelman).

A calibration standard was first prepared for this organic primer composition and organic print substrate material combination (PEI primer and PET substrate) using a FTIR-ATR apparatus (Thermo Nicolet 6700 equipped with Smart Multi Bounce HATR and Ge crystal).

Figure 8:
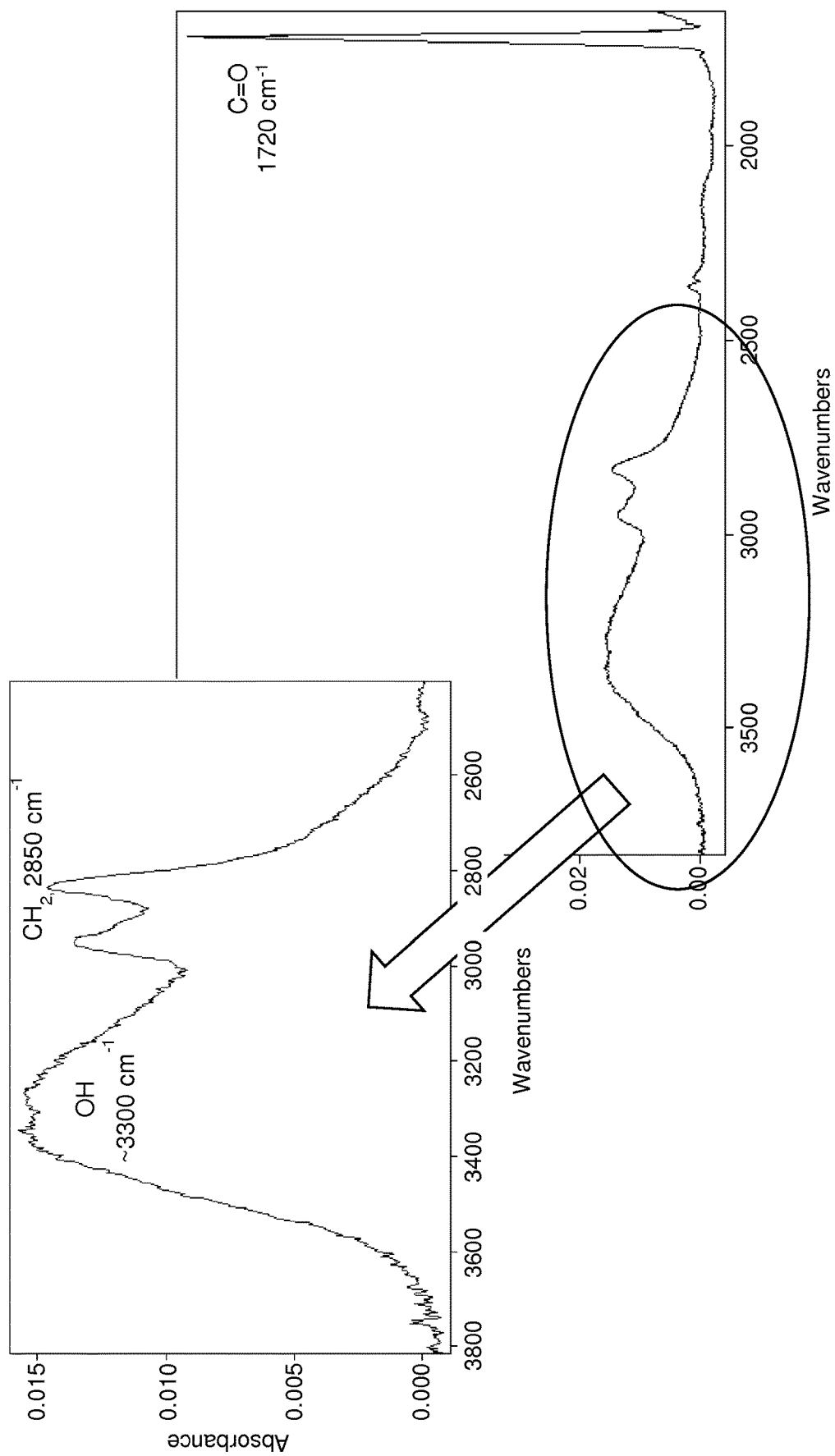
FIG. 8 shows an example of a FTIR spectrum of a primed print substrate, including a magnified view of the section of the spectrum showing $CH_2$ and OH peaks.

Fifteen primed print substrates having a PET print substrate and a PEI primer layer were prepared using different primer coating techniques to provide primed print substrate samples having a range of primer composition coat weights. Six of the primed print substrates were prepared using a tinting coating (ILP) technique (using a HP Indigo 6000 series press) and nine primed substrates were prepared using a flexo-gravure coating (PUW) method using a HP Indigo 20000 series press). Flexo-gravure coating methods tend to provide a higher primer composition coat weight than tinting coating methods. A FTIR spectrum was obtained for each of the primed substrates using the FTIR-ATR apparatus, by using the apparatus to measure the background (air) signal and then placing the primed print substrate such that the primer layer faced the ATR crystal (Ge crystal) for each primed print substrate to obtain a FTIR spectrum for each primed print substrate. An example of a FTIR spectrum obtained is shown in FIG. 7 (labelled primer side) overlying a FTIR spectrum of the PET print substrate with no primer layer (labelled no primer side). A further example of a FTIR spectrum of a primed print substrate, including a magnified view of the section of the spectrum showing $CH_2$ and OH peaks of the primer is shown in FIG. 8.

Each FTIR spectrum was baseline corrected at the following wavenumbers: 3680 $cm^{-1}$, 2450 $cm^{-1}$, 1850 $cm^{-1}$, 1650 $cm^{-1}$, 1450 $cm^{-1}$, 1350 $cm^{-1}$. Then the methylene ($CH_2$) peak at 2850 $cm^{-1}$, characteristic of the PEI primer, and the carbonyl (C=O) peak at 1720 $cm^{-1}$, characteristic of the PET substrate, was identified on each FTIR spectrum and the peak area of each of these peaks was calculated by integration. The primer peak area was calculated by integrating the peak on the FTIR spectrum from 2880-2490 $cm^{-1}$. The print substrate peak area was calculated by integrating the peak on the FTIR spectrum from 1754-1690 $cm^{-1}$. For each of the primed substrates, the peak area ratio of the methylene ($CH_2$) peak at 2850 $cm^{-1}$ to the carbonyl (C=O) peak at 1720 $cm^{-1}$ was calculated.

Figure 9:
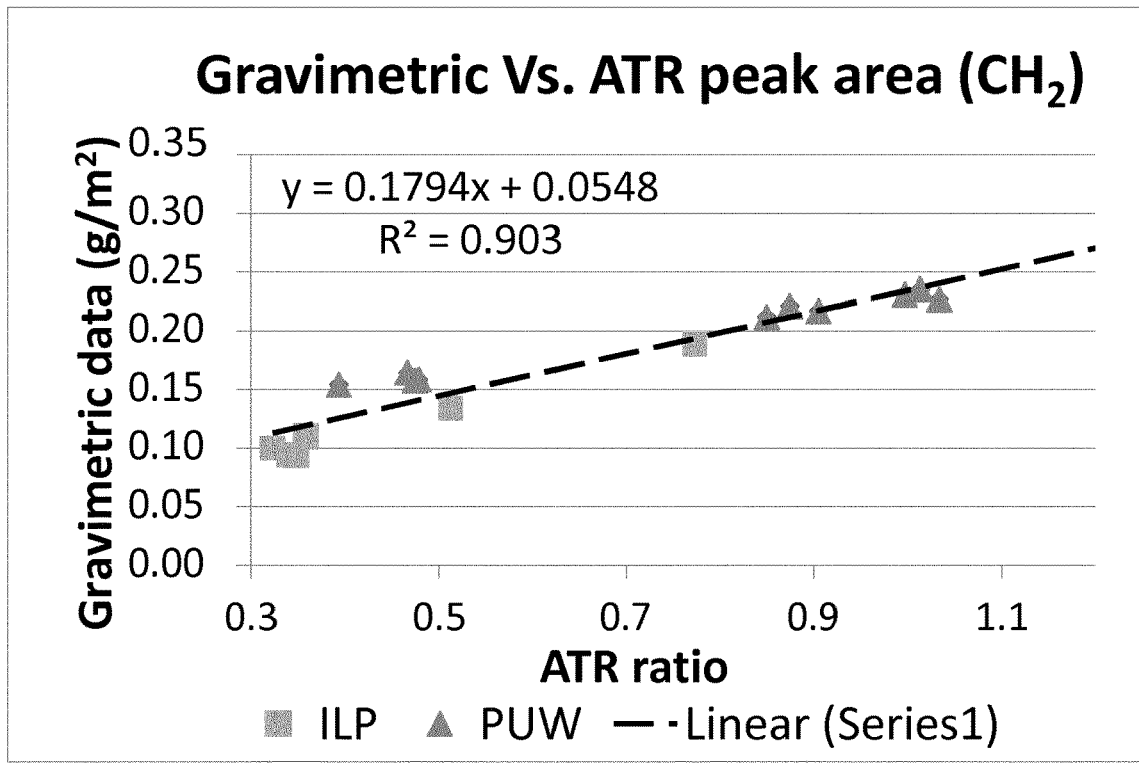
FIG. 9 shows an example of a graph obtained by plotting the peak area ratio obtained from a FTIR spectrum for a primed print substrate of a methylene ($CH_2$) peak at 2850 $cm^{-1}$ of the primer composition to the carbonyl (C=O) peak at 1720 $cm^{-1}$ of the print substrate against the known primer coat weight.

The peak area ratio of the methylene ($CH_2$) peak at 2850 $cm^{-1}$ to the carbonyl (C=O) peak at 1720 $cm^{-1}$ ($CH_2$ ATR ratio) was then plotted against the known primer coat weight (obtained by gravimetric analysis in which each sample was weighed, cleaned and weighed again) for each of the fifteen primed print substrates to produce the calibration standard shown in FIG. 9.

Figure 10:
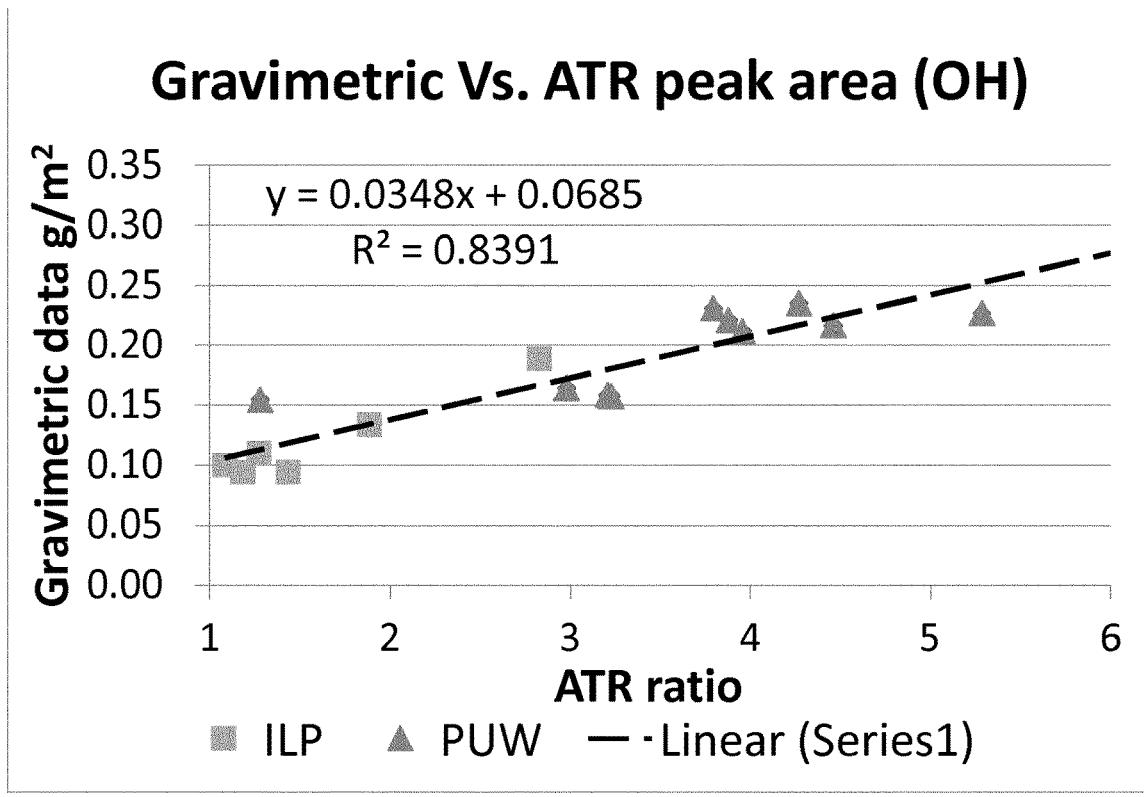
FIG. 10 shows an example of a graph obtained by plotting the peak area ratio obtained from a FTIR spectrum for a primed print substrate of a OH peak at about 3300 $cm^{-1}$ of the primer composition to the carbonyl (C=O) peak at 1720 $cm^{-1}$ of the print substrate against the known primer coat weight.

The OH peak at about 3300 $cm^{-1}$ is an additional peak in the FTIR spectra which is characteristic of the PEI primer composition. The peak area of the OH peak at about 3300 $cm^{-1}$ was calculated by integrating the peak on the FTIR spectrum from 3670-3000 $cm^{-1}$. For each of the primed print substrates, the peak area ratio of the OH peak at 3670-3000 $cm^{-1}$ to the C=O peak at 1720 $cm^{-1}$ (OH ATR ratio) was then plotted against the known primer coat weight for each of the fifteen primed print substrates to produce the calibration standard shown in FIG. 10.

The calibration standard was then used to determine the primer composition coat weight ($g/m^2$) for other primed print substrate having a PET print substrate and a PEI primer layer disposed thereon. This method can be used to determine the primer coat weight using FTIR-ATR spectroscopy without requiring time consuming and operator dependent gravimetric analysis. For a primed print substrate for which the primer composition coat weight is to be determined, a FTIR spectrum was obtained using the FTIR-ATR apparatus (Thermo Nicolet 6700 equipped with Smart Multi Bounce HATR and Ge crystal), by using the apparatus to measure the background (air) signal and then placing the primed print substrate such that the primer layer faced the ATR crystal (Ge crystal) to obtain a FTIR spectrum for the primed print substrate. The FTIR spectrum was baseline corrected at the wavenumbers 3680 $cm^{-1}$, 2450 $cm^{-1}$, 1850 $cm^{-1}$, 1650 $cm^{-1}$, 1450 $cm^{-1}$, 1350 $cm^{-1}$. Then the methylene ($CH_2$) peak at 2850 $cm^{-1}$, characteristic of the PEI primer, and the carbonyl (C=O) peak at 1720 $cm^{-1}$, characteristic of the PET substrate, were identified on the FTIR spectrum and the peak area of each of these peaks was calculated by integration (as described above). The peak area ratio of the methylene ($CH_2$) peak at 2850 $cm^{-1}$ to the carbonyl (C=O) peak at 1720 $cm^{-1}$ was then calculated. The calibration standard produced as described above and as shown in FIG. 9 was then used to determine the primer composition coat weight. For example, for a calculated peak area ratio of the methylene ($CH_2$) peak at 2850 $cm^{-1}$ to the carbonyl (C=O) peak at 1720 $cm^{-1}$ of 0.7, the primer composition coat weight was determined to be 0.18 $g/m^2$.

The present inventors have found that FTIR-ATR can be used to determine the coat weight of an organic primer disposed on an organic print substrate.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The features of any dependent claim may be combined with the features of any of the independent claims or other dependent claims.

The invention claimed is:

1. A method for assessing primer composition coat weight on a print substrate, the method comprising:
    providing a primed print substrate comprising an organic print substrate material on which a primer layer comprising an organic primer composition is disposed;
    spectroscopically analysing the primed print substrate using Fourier transform infrared (FTIR) spectroscopy by attenuated total reflectance (ATR) to produce a FTIR spectrum of the primer layer disposed on the print substrate;
    identifying a primer peak in the FTIR spectrum which is characteristic of the organic primer composition;
    identifying a print substrate peak in the FTIR spectrum which is characteristic of the organic print substrate material; and
    comparing the primer peak and the print substrate peak to assess the primer composition coat weight on the print substrate of the primed print substrate.

2. A method according to claim 1 comprising calculating a parameter of the primer peak and calculating the same parameter of the print substrate peak, and wherein comparing the primer peak and the print substrate peak comprises calculating the peak parameter ratio of the primer peak parameter to the print substrate peak parameter.

3. A method according to claim 2, wherein comparing the primer peak and the print substrate peak further comprises comparing the calculated peak parameter ratio with a calibration standard to determine the primer composition coat weight on the print substrate of the primed print substrate, the calibration standard being prepared by calculating a peak parameter ratio from FTIR spectra obtained for each of a plurality of primed print substrate samples each comprising a primer layer having a known coat weight of the primer composition disposed on the print substrate material.

4. A method according to claim 3, wherein the parameter of the primer peak and the parameter of the print substrate peak is the area of the primer peak and the area of the print substrate peak.

5. A method according to claim 1, wherein the organic primer composition comprises a group having an absorption primer peak in the range of either 2000-1350 cm-1 or 3000-2400 cm', and the print substrate material comprises a group having an absorption print substrate peak in the other of the range of 2000-1350 cm-1 or 3000-2400 cm'.

6. A method according to claim 1, wherein the primer composition comprises methylene groups having an absorption primer peak in the range of about 2900-2500 cm-1.

7. A method according to claim 6, wherein the primer composition comprises a polyethylene imine resin.

8. A method according to claim 1, wherein the print substrate comprises a synthetic polymeric material, the polymer of the polymeric material comprises carbonyl groups having an absorption print substrate peak in the range of about 1690-1760 cm-1.

9. A method according to claim 8, wherein the polymer is polyethylene terephthalate (PET).

10. A method according to claim 1 further comprising determining the primer composition coverage on the primed print substrate.

* * * * *